United States Patent

Lum et al.

[11] Patent Number: 5,916,960
[45] Date of Patent: *Jun. 29, 1999

[54] WATER-BASED, STORAGE STABLE, SELF-CURING COATING COMPOSITION

[75] Inventors: Dorey Lum, Suffern, N.Y.; Prashant Patel, Aliso Viejo, Calif.

[73] Assignee: The Sherwin-Williams Company, Cleveland, Ohio

[*] Notice: This patent is subject to a terminal disclaimer.

[21] Appl. No.: 08/955,418

[22] Filed: Oct. 22, 1997

Related U.S. Application Data

[63] Continuation of application No. 08/660,717, Jun. 10, 1996, abandoned, which is a continuation of application No. 08/171,577, Dec. 21, 1993, abandoned.

[51] Int. Cl.[6] ................................ C08J 3/03; C08L 75/00
[52] U.S. Cl. .................. 524/507; 524/501; 524/548; 524/517
[58] Field of Search ...................... 524/501, 507, 524/548, 517

[56] References Cited

U.S. PATENT DOCUMENTS

| | | | |
|---|---|---|---|
| 3,862,074 | 1/1975 | Hickey | 260/29.6 |
| 4,066,591 | 1/1978 | Scrives et al. | 260/29.2 |
| 4,108,811 | 8/1978 | Eckhoff | 260/22 |
| 4,396,738 | 8/1983 | Powell et al. | 524/228 |
| 4,442,248 | 4/1984 | Kanda et al. | 523/414 |
| 4,888,383 | 12/1989 | Huybrechts | 524/832 |
| 4,906,684 | 3/1990 | Say | 524/548 |
| 4,927,876 | 5/1990 | Coogan et al. | 524/457 |
| 4,954,559 | 9/1990 | Hartog et al. | 524/507 |
| 5,006,413 | 4/1991 | Hartog et al. | 428/463 |
| 5,137,961 | 8/1992 | Goos et al. | 524/457 |
| 5,141,983 | 8/1992 | Hasegawa et al. | 524/457 |
| 5,173,526 | 12/1992 | Vijayendran et al. | 524/457 |
| 5,439,952 | 8/1995 | Lum et al. | 523/410 |

FOREIGN PATENT DOCUMENTS

| | | |
|---|---|---|
| 0350040 | 1/1990 | European Pat. Off. . |
| 3440535 | 5/1986 | Germany . |
| 57-61050 | 4/1982 | Japan . |
| 2-91170 | 3/1990 | Japan . |

*Primary Examiner*—James J. Seidleck
*Assistant Examiner*—U. K. Rajguru
*Attorney, Agent, or Firm*—Vivien Y. Tsang; Robert E. McDonald; Heidi A. Boehlefeld

[57] ABSTRACT

A coating composition has storage stability, and provides a highly durable coating on various substrates, such as wood. It can be a clear coating or a staining composition. The critical components of the composition are a self-curing vinyl polymer, an ammonia-neutralized polyurethane and a water-soluble catalyst to promote rapid curing under ambient conditions.

26 Claims, No Drawings

5,916,960

WATER-BASED, STORAGE STABLE, SELF-CURING COATING COMPOSITION

This application is a continuation, of application Ser. No. 08/660,717 filed Jun. 10, 1996, now abandoned, which in turn, was a continuation of application Ser. No. 08/171,577, filed Dec. 21, 1993, now abandoned.

FIELD OF THE INVENTION

This invention relates to a water-based, storage stable coating composition which is self-curing at room temperature. More particularly, this invention relates to a water-based coating composition of a polyurethane and a self-curing acrylic polymer which can be applied to various substrates, such as wood.

BACKGROUND OF THE INVENTION

Protective coatings for various substrates, including metals, wood, ceramics and paper products are desired to provide resistance to scuffing, abrasion, solvents, foods and soiling. Many coating compositions are solvent-based which may be disadvantageous in use and proper disposal.

Various water-based blends of acrylic polymers and polyurethanes are known for application to various substrates, such as metals, ceramics and wood. For example, water-based coating compositions for base coats or clear coats of metal parts in automobiles are described in U.S. Pat. No. 4,954,559 (Hartog et al).

Such blends have a number of advantages, but also suffer from certain disadvantages, including their thermoplastic nature which limits durability and resistance to common household chemicals (such as detergents, bleach, ammonia), food products and soiling.

Two component coating systems have been produced which provide highly durable coatings which have desired resistance to the household chemicals, food products and soiling. However, these systems may present health hazards, and thus they are not amenable to use for the typical do-it-yourself consumer. Professional application is thus necessary.

One aqueous blend of vinyl monomers and a polyurethane prepolymer is described in U.S. Pat. No. 5,173,526 (Vijayendran et al). The composition includes an oil soluble initiator to cause polymerization of the vinyl monomers during drying. The polyurethane is neutralized with a tertiary amine. There does not appear to be an appreciable amount of self-curing in the vinyl polymer although some crosslinkable monomers are described. The problem with this type of dispersion is that it requires polymerization and chain extension of the polyurethane after mixing, and long curing times unless the curing temperature is raised.

Other compositions having low solvent content are described in the Hartog et al patent noted above. The vinyl polymer is prepared from methylol (meth)acrylamides and other vinyl monomers, including monomers having carboxylic acid groups. There is no suggestion that these dispersions are self-curing, and in preferred embodiments, the polyurethanes can be omitted. These dispersions require some heat for curing and thus are not useful for the typical "do it yourself" consumer.

Still another water-based composition is described in U.S. Pat. No. 4,927,876 (Coogan et al) wherein an aromatic polyurethane is neutralized with a tertiary amine or hydroxide. The vinyl polymer is not self-curing.

U.S. Pat. No. 5,137,961 (Goos et al) relates to a surfactant-free aqueous polymer dispersion containing an anionic vinyl polymer and a polyurethane which is neutralized with triethylamine. Such polyurethanes do not have desired storage stability. Moreover, the composition is not self-curing.

U.S. Pat. No. 5,141,983 (Hasegawa et al) describes the preparation of an aqueous dispersion of a polyurethane and an anionic acrylic copolymer. The polyurethane is neutralized with various materials and the vinyl polymer is prepared by polymerization in the presence of the polyurethane.

In an attempt to provide easy to use coating compositions, considerable development has been carried out to avoid the problems exhibited by known compositions, such as instability upon long term storage, lack of resistance to marring and scuffing and ease of manufacture. Various neutralized polyurethanes have been tried, including those neutralized with triethylamine. Neutralization with these materials has one or more disadvantages, such as poor storage stability of the composition.

Thus, there remains a need for a self-curing, storage stable, water-based coating composition which can be readily used by consumers who like to do home repairs and remodeling and which provides a highly durable and light stable coating on wood or other substrates.

SUMMARY OF THE INVENTION

The problems noted above with known water-based coating compositions are overcome with a water-based, storage stable coating composition which is self-curing at room temperature, comprising:

a) an aqueous dispersion having a pH of from about 7.5 to about 10, and comprising a self-curing vinyl polymer prepared by addition polymerization of:

i) an ethylenically unsaturated polymerizable monomer having an active methylene group, ii) an ethylenically unsaturated polymerizable monomer having an epoxy group, iii) an ethylenically unsaturated polymerizable carboxylic acid monomer, and iv) one or more additional ethylenically unsaturated polymerizable monomers other than those in groups i), ii) and iii), provided that:

the weight ratio of monomer i) to monomer ii) is less than or equal to about 1:2 or greater than or equal to about 3:2 based on the total weight of monomers i) and ii), the weight ratio of monomer ii) to monomer iii) is greater than or equal to about 3:2 based on the total weight of monomers ii) and iii), the total amount of monomers i), ii) and iii) incorporated into the vinyl polymer is from about 8 to about 60 weight percent of the total weight of said vinyl polymer, monomer iv) is present in an amount of from about 40 to about 92 weight percent of the total weight of said vinyl polymer, b) a polyurethane dispersion prepared by chain extension of a prepolymer reaction product of a diisocyanate and one or more polyols, at least one polyol being a carboxy-substituted polyol, the polyurethane being neutralized with ammonia or ammonium hydroxide, and c) a water-soluble catalyst for initiating crosslinking of the self-curing vinyl polymer, the weight ratio of the self-curing vinyl polymer to the polyurethane being from about 1:9 to about 9:1.

This invention also provides a method for preparing a water-based, storage stable coating composition which is self-curing at room temperature, comprising:
A) providing, in any order:
  a) the aqueous vinyl polymer dispersion described above,
  b) the polyurethane dispersion described above, and
  c) the water-soluble catalyst described above,
the weight ratio of the self-curing vinyl polymer to the polyurethane being from about 1:9 to about 9:1, and
B) mixing a), b) and c) in water with stirring.

The coating composition of this invention has a number of advantages. First of all, it is self-curing at room temperature so that when the user applies it to a substrate, it will dry to a highly durable and stain resistant coating very quickly without application of heat or chemical reagents. The resulting coating is resistant to most household solvents, detergents and foods and resistant to discoloration from exposure to light. Professional application is not necessary since the components are present in a single dispersion which is easily and safely applied by typical "do it yourself" consumers. Moreover, the composition can be stored for extended time without gelation or degradation of its components. The composition is readily prepared by mixing a number of readily available components in water, thereby providing a single-component product for the consumer. The two-component systems of the prior art, requiring component mixing by the user, are therefore avoided.

These advantages are achieved by using a unique aqeuns blend of a carboxylated vinyl polymer which contains recurring units of active methylene groups which provide sites for polymer crosslinking or self-curing. In addition, the blend contains certain amounts of a polyurethane to provide coating durability. The polyurethane is neutralized with ammonia or ammonium hydroxide to provide an additional advantage of storage stability for long periods of time.

DETAILED DESCRIPTION OF THE INVENTION

The coating composition of this invention has excellent adhesion and provides a finish on various substrates (including wood, leather, metal, polymers, glass, cloth, paper, and foam) which is hard, durable and resistant to various household chemicals. In particular, various woods can be coated with the coating composition to provide moisture resistance as well as staining if desired. The composition can be applied to the substrate using any conventional method, including brushing, dipping, flow coating, spraying and others readily apparent to one skilled in the art.

A first critical component of the composition to provide ambient self-curing properties is a self-curing, water-dispersible vinyl polymer which can be supplied in the form of an aqueous dispersion having a pH of from about 7.5 to about 10 (preferably from about 8 to about 9).

This vinyl polymer is prepared from four or more $\alpha$, $\beta$-unsaturated ethylenically unsaturated polymerizable monomers using conventional emulsion polymerization techniques with conventional free radical initiators and anionic or nonionic (or mixtures of either or both) surfactants. Typical conditions for polymerization are well known in the art, including for example U.S. Pat. No. 4,906,684 (Say), incorporated herein by reference with respect to the monomers and polymerization conditions described therein. The vinyl polymer generally has a glass transition temperature of less than or equal to 60° C. so as to minimize the amount of coalescing agent that may be needed in the dispersion.

There are four types of $\alpha$, $\beta$-ethylenically unsaturated polymerizable monomers used to prepare the noted vinyl polymer.

First of all, one or more monomers having an active methylene group are used. An "active methylene group" is defined in the art as a methylene group positioned between two electronegative groups (such as, but not limited to, carbonyl and cyano groups), which is capable of Michael addition across double bonds and reactive with epoxy groups. Malonic esters, acetoacetic esters, cyanoacetic esters and 1,3-diketones are examples of compounds containing "active methylene groups". Useful monomers include, but are not limited to, 2-acetoacetoxyethyl acrylate, 2-acetoacetoxyethyl methacrylate, N-(2-cyanoacetoxyethyl) acrylamide, 4-cyanoacetyl-1-methacyloylpiperazine, N-(2-propionylacetoxybutyl)acrylamide, N-(2-valerylacetoxyphenyl)acrylamide, N-4-(acetoacetoxymethyl)benzylmethacrylamide, N-4-(acetoacetoxybenzyl)phenylmethacrylamide, N-(2-acetoacetoxyethyl)acrylamide, N-(3-acetoacetamidopropyl)methacrylamide, N-(2-acetoacetamidoethyl)methacrylamide, 4-acetoacetyl-1-methacryloylpiperazine, acetoacetamidoethyl methacrylate, 4-acetoacetyl-1-acryloylpiperazine, N-(2-propionylacetoxyethyl)acrylamide, N-(2-valerylacetoxypropyl)methacrylamide and others which would be readily apparent to one skilled in polymer chemistry. The monomers 2-acetoacetoxyethyl acrylate and 2-acetoacetoxyethyl methacrylate are preferred. Any of these monomers can be readily prepared using known procedures and starting materials, or purchased from any of several commercial sources.

One or more ethylenically unsaturated polymerizable monomers having one or more epoxy groups are also used in preparing the self-curing vinyl polymer. Such monomers can be prepared by esterification of carboxylated monomers, such as acrylic or methacrylic acid, with glycidol or with epichlorohydrin followed by dehydrohalogenation. Particularly useful epoxy-containing monomers include, but are not limited to, glycidyl acrylates, glycidyl methacrylates, allyl glycidyl ethers and others which would be readily apparent to one skilled in polymer chemistry. Particularly useful are glycidyl acrylate and glycidyl methacrylate.

A third type of ethylenically unsaturated polymerizable monomers incorporated into the self-curing polymer described herein includes those having one or more carboxylic acid groups. Generally, such monomers contain from 3 to 24 carbon atoms and one or more carboxy groups per molecule. Such monomers include, but are not limited to, acrylic acid, methacrylic acid, maleic acid, fumaric acid, itaconic acid, aconitic acid, $\beta$-carboxyethyl acrylate, $\beta$-carboxyethyl methacrylate, m&p-carboxymethylstyrene, methacrylamidohexanoic acid, N-(2-carboxy-1,1-dimethylethylacrylamide, ethacrylic acid, crotonic acid, citraconic acid and half esters of the dicarboxylic acids wherein the esterified alcohol group contains from 1 to 20 carbon atoms. Examples of suitable half esters are methyl hydrogen fumarate, benzyl hydrogen itaconate, dodecyl hydrogen citraconate and others readily apparent to one skilled in the art. Other useful monomers are described in EP-A-0 466 220 (published Jan. 15, 1992). Preferred monomers are acrylic acid and methacrylic acid.

The fourth type of monomers used to prepare the self-curing vinyl polymer includes one or more $\alpha$, $\beta$-ethylenically unsaturated polymerizable monomers other than those in the three groups described above which are copolymerizable with those monomers but not reactive with the active methylene, epoxy or carboxy groups of those three groups of monomers under the conditions of polymerization. Such monomers include, but are not limited to, acrylic and methacrylic acid esters (both mono- and diesters) and amides, wherein the ester group has 1 to 20 carbon atoms, vinyl aromatics, vinyl ethers, vinyl ketones, nitriles, aliphatic vinyl esters, and others readily apparent to one skilled in the art. Representative of such monomers include, but are not limited to, methyl acrylate, methyl methacrylate, ethyl acrylate, ethyl methacrylate, isopropyl acrylate, isopropyl methacrylate, butyl acrylate, butyl methacrylate, 2-ethylhexyl methacrylate, hexanediol diacrylate, decyl acrylate, lauryl methacrylate, benzyl acrylate, 2-hydroxyethylmethacrylate, ethylene dimethacrylate, acrylamide, methacrylamide, maleamide, N-methylacrylamide, itaconic acid amide, N-ethoxymethylacrylamide, N-methylolacrylamide, acrylonitrile, styrene, vinyltoluene, 4-t-butylstyrene, α-methylstyrene, 2-chloromethylstyrene, divinylbenzene, p-styrenesulfonate, sodium acrylamido-2-methylpropanesulfonate, sodium 3-acryloyloxypropanesulfonate, vinyl formate, vinyl acetate, vinyl propionate, vinyl butyrate, butadiene, isoprene, vinyl methyl ketone and vinyl butyl ketone. Preferred monomers are methyl methacrylate, butyl acrylate and mixtures of both.

The four types of monomers described above are copolymerized in certain ratios to provide the desired properties described herein. In particular, the weight ratio of one or more monomers i) containing the active methylene groups to the one or more monomers ii) containing epoxy groups is less than or equal to about 1:2 or greater than or equal to about 3:2 based on the total weight of monomers i) and ii). Also, the weight ratio of the one or more monomers ii) to the one or more monomers iii) is greater than or equal to about 3:2 based on the total weight of the two types of monomers. Moreover, the ii) and iii) is monomers i), ii) and iii) is from about 8 to about 60 weight percent of the total polymer weight and the one or more monomers iv) are present at from about 40 to about 92 weight percent.

Generally, the solids content of the aqueous dispersion containing the vinyl polymer is from about 20 to about 70 percent with from about 40 to about 60 percent being preferred. Most of the solids will be the vinyl polymer.

After emulsion polymerization, the pH of the emulsion can be adjusted to the appropriate pH using water soluble bases, such as alkali metal, ammonia or ammonium hydroxide bases. Useful bases are well known in the art, but tetramethylammonium hydroxide is preferred.

One skilled in the art would readily be able to formulate any of the aqueous dispersions of self-curing vinyl polymers described herein using the foregoing teaching as well as that provided in U.S. Pat. No. 4,906,684 (noted above). A preferred latex dispersion containing a preferred self-curing vinyl polymer is commercially available from Rhone-Poulenc, Inc. (Cranbury, N.J.) under the trademark AMB-ICURE™ XP 150.

A polyurethane dispersion is also included in the coating composition of this invention. This material is prepared by diamine chain extension of a prepolymer reaction product of a diisocyanate and one or more polyols, at least one polyol being a carboxy-substituted diol. For example, the polyurethane can be prepared by reacting a diisocyanate, a glycol and a carboxy-substituted diol to form a prepolymer under conventional conditions, neutralizing the prepolymer (as described below), and extending the polymer chain using conventional techniques and chain extenders.

Diisocyanates useful in the preparation of the polyurethane are aliphatic, araliphatic, alicyclic or aromatic compounds which are conventionally used in preparing such polymers. Examples include, but are not limited to, ethylene diisocyanate, tetramethylene diisocyanate, 2,3-dimethylethylene diisocyanate, ethylethylene diisocyanate, 1,6-hexamethylene diisocyanate, 1,12-dodecane diisocyanate, 2-methylpentamethylene diisocyanate, 1-methyltrimethylene diisocyanate, isophorone diisocyanate, 2,4,4-trimethylhexamethylene diisocyanate, 1,3-cyclopentylene diisocyanate, cyclohexylene-1,4-diisocyanate, 4,4'-dicyclohexylmethane diisocyanate, 4,4'-dicyclohexylmethane diisocyanate, lysine diisocyanate, 3,3-dimethyl-4,4'-biphenylene diisocyanate, 3,3'-dimethoxy-4,4'-biphenylene diisocyanate, 3,3'-dichloro-4,4'-biphenylene diisocyanate, 1,5-, tetrahydronaphthalene diisocyanate, p-xylylene diisocyanate, tetramethylxylylene diisocyanate, 1,4-phenylene diisocyanate, 2,4-tolylene diisocyanate, 2,6-tolylene diisocyanate, 4,4'-diphenylmethane diisocyanate, 2,4'-diphenylmethane diisocyanate, 1,5-naphthylene diisocyanate, bis(4-isocyanatocycloether-4,4-diisocyanatodiphenylhexyl)methane and others which would be readily apparent to a skilled worker in the art. Mixtures of diisocyanates can be used also.

The aliphatic and alicyclic diisocyanates listed above are preferred in order to improve light stability of the resulting composition. The aliphatic diisocyanates are more preferred, and 4,4'-dicyclohexylmethane diisocyaante is most preferred.

Polyols which are not carboxy-substituted and which can be used in the preparation of the prepolymer include any in the various chemical classes of polyols (such as diols, triols and glycols) which are conventionally used in this art. The polyols can be polyesters, polyesteramides, polythioethers, polyethers, polycarbonates, polyacetals, polyolefins or polysiloxanes. Mixtures of such polyols can also be used.

Polyester polyols include hydroxy-terminated reaction products of polyhydric alcohols with polycarboxylic acids or their ester-forming derivatives. Polyether polyols include the products of polymerization of a cyclic oxide or by the addition of one or more oxides to polyfunctional initiators. Polythioether polyols include products obtained by condensing thiodiglycol ether alone or with other glycols, dicarboxylic acids, formaldehyde, aminoalochols or aminocarboxylic acids. Polycarbonate polymers include products obtained by reacting diols with diaryl carbonates or with phosgene. Polyacetal polyols includes those prepared by reacting glycols with formaldehyde. Suitable polyolefin polyols include hydroxy-terminated butadiene homo and copolymers.

Examples of useful polyols include, but are not limited to, ethylene glycol, diethylene glycol, triethylene glycol, 1,2-propylene glycol, 1,3-butylene glycol, tetramethylene glycol, 1,6-hexanediol, neopentyl glycol, hexamethylene glycol, decamethylene glycol, octanediol, tricyclodecanedimethylol, furan dimethanol, hydrogenated bisphenol A, cyclohexandimethanol, glycerol, trimethylolpropane, pentaerythritol and others readily apparent to one skilled in the art. Other useful polyols are described, for example, in U.S. Pat. No. 4,927,876 and U.S. Pat. No. 5,137,961 (both noted above). Polyester diols, such as 1,6-hexanediol and cyclohexanedimethanol and glycols such as neopentyl glycol adipate, poly(hexamethylene adipate)glycol, poly(tetramethylene)glycol, poly(caprolactone)glycol, poly(carbamate)glycol and poly(tetramethylene adipate)glycol are preferred in the practice of this invention.

Additional teaching of materials useful in preparing prepolymers for eventual preparation of a useful polyurethane are provided in U.S. Pat. No. 4,066,591 (Scriven et al), incorporated herein by reference.

Also used in preparing the prepolymer are one or more carboxy-substituted polyols (for example, diols or triols) such as dihydroxyalkanoic acids, for example, 2,2-dimethylolpropionic acid, and aminocarboxylic acids, for example lysine, cystine and 3,5-diaminobenzoic acid. Most preferred in the practice of this invention is 2,2-dimethylolpropionic acid.

The prepolymers are prepared in a conventional manner by reacting a stoichiometric excess of the diisocyanate with the polyols, including the carboxy-substituted polyol under substantially anhydrous conditions at a temperature in the range of from about 30 to about 130° C. until reaction between the diisocyanate and the polyols is substantially complete. The diisocyanate and the polyols are present in such proportions that the ratio of isocyanate groups to the hydroxy groups is in the range of from about 1.1:1 to about 6:1, and preferably in the range of from about 1.5:1 to about 3:1.

If desired, catalysts such as dibutyltin dilaurate and stannous octoate may be used to assist prepolymer formation and a non-reactive solvent may be added before or after prepolymer formation to control the viscosity. Suitable solvents which may be used include, but are not limited to, acetone, methylethylketone, N,N-dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The water-miscible solvents in the foregoing list are preferred.

A particularly useful polyurethane is prepared by making a prepolymer from poly(1,6-hexanediol/neopentyl glycol adipate), 2,2-dimethylol propionic acid, and 4,4'-dicyclohexylmethane diisocyanate, neutralized with ammonium hydroxide, and chain extended using hydrazine. This polyurethane is commercially available in an aqueous dispersion from Zeneca Resins, Ltd. as NEOREZ XR 9684. Particular details for preparing this and other useful polyurethanes are provided in U.S. Pat. No. 4,066,591 (noted above, particularly Example 16) and in EP-A-0 017 199.

Aqueous polyurethane dispersions can be prepared by dispersing the water-dispersible prepolymer in an aqueous medium and chain extending the prepolymer with an active hydrogen containing non-aromatic chain extender. Dispersing the prepolymer in water can be accomplished using well known techniques. Preferably, it is added to water with agitation. Alternatively, water can be stirred into the prepolymer.

Conversion of the carboxyl groups in the prepolymer to ionic salt groups (also known as neutralization) can be achieved before, simultaneously with or after prepolymer dispersion in water. Neutralization is achieved using ammonia, ammonium hydroxide or an equivalent unsubstituted ammonium compound, in an amount of at least about 0.5%, by weight. From about 1 to about 3%, by weight, is preferred. Ammonium hydroxide is the preferred neutralization agent.

Suitable chain extenders include, but are not limited to, ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylene diamine, tris(2-aminoethyl)amine, isophorone diamine, 3,3'-dinitrobenzidine, 4,4'-methylenebis(2-chloroaniline), 3,3'-dichloro-4,4'-biphenyl diamine, hydrazine and other compounds readily apparent to one skilled in the art. Preferred chain extenders are the non-aromatic chain extenders, such as isophorone diamine, ethylene diamine, diethylene triamine, cyclohexane diamine and hydrazine.

The chain extender can be added to the aqueous dispersion of the prepolymer, or it may be already present when the prepolymer is dispersed in the water. Chain extension can be conducted at any convenient temperature within the range of from about 5 to about 95° C. The amount of chain extender should be approximately equivalent to the free isocyanate groups in the prepolymer, and the ratio of active hydrogen in the chain extender to isocyanate groups is preferably in the range of from about 1:1 to about 2:1.

The self-curing vinyl polymer and polyurethane described herein are dispersed in water by simply blending aqueous dispersions of each material together with appropriate stirring under ambient conditions (room temperature and humidity). Mixtures of vinyl polymers and polyurethanes can be used if desired. The weight ratio of self-curing vinyl polymer to the polyurethane in the final dispersion is from about 1:9 to about 9:1, with a ratio of from about 1:4 to about 4:1 being preferred. Ratios of from about 1:1 to about 3:1 are more preferred. Other techniques for forming the final dispersion would be readily apparent to one skilled in the art. The viscosity of the final dispersion is generally from about 20 to about 1000 centipoise, with a viscosity close to that of water being preferred. The percent solids (polymers and other additives) will be within the range of from about 20 to about 70%. The pH of the final coating composition is generally from about 7.5 to about 10, with a preferred pH in the range of from about 7.5 to about 8 ("about" referring to a 0.2 variation) being preferred. The polymers and other components can be added to water in any order, but preferably, the vinyl polymer dispersion is prepared or provided first and all other components including the polyurethane are added to it with appropriate stirring.

Included in the coating composition of this invention are one or more water-soluble catalysts for initiating crosslinking of the self-curing vinyl polymer. Such compounds are generally water-soluble compounds which will promote the crosslinking reactions among the reactive groups on the vinyl polymer. More particularly, the crosslinking occurs between the active methylene and glycidyl groups, and the glycidyl and carboxyl groups. Particularly useful catalysts include, but are not limited to, alkali metal or ammonium hydroxides, such as sodium hydroxide, potassium hydroxide, ammonium hydroxide, tetraalkylammonium hydroxides (such as tetramethylammonium hydroxide) and others readily apparent to one skilled in the art. A preferred catalyst is tetramethylammonium hydroxide. The amount of catalyst in the composition of this invention is generally added to a pH of about 9.

The composition of this invention can optionally contain minor amounts (less than about 15 weight percent) of one or more organic solvents, pigments, dyes, emulsifiers, surfactants, thickeners, levelling agents, defoamers, freeze-thaw additives, coalescing agents, mar resistance additives, plasticizers, fillers, UV absorbers, antioxidants and other materials which would be readily apparent to one skilled in the art. The composition can also include one or more pigments to provide a desired staining of the coated substrate. The amounts of such optional components useful in the compositions would be readily apparent to one skilled in the art.

In a preferred embodiment, the composition also includes at least about 0.01 percent (based on total composition weight) of an aldehyde, carbodiimide or polyfunctional aziridine to reduce discoloration of the composition during storage. Benzaldehyde is preferred for this purpose, and further details are described in copending application filed by ourselves on even date herewith, U.S.S.N. 08/171,073, now U.S. Pat. No. 5,439,952 which is entitled "Self-Curing Coating Composition Exhibiting Reduced Discoloration Upon Storage".

The composition of this invention is stable over long term storage. By "storage stable", we mean that the composition does not coagulate when stored at about 55° C. for at least 10 days. The composition is also self-curing under ambient conditions of room temperature and relative humidity. By "room temperature" is meant generally in the range of from about 10 to about 35° C. Ambient relative humidity for best self-curing is from about 25 to about 80%. No external heat is necessary to cause curing of the polymer after the coating composition is applied to a substrate.

The following examples are provide to illustrate, but not limit, the scope of this invention. Unless otherwise noted, all percentages are by weight.

EXAMPLE 1

Preferred Coating Composition

This example shows the formulation of a preferred coating composition of this invention.

The coating composition was prepared by blending the following ingredients, with stirring, in the order listed at room temperature. Each ingredient was added slowly and mixed for 10–15 minutes before the next addition was made. The noted amounts are weight percent based on total composition weight.

Composition Ingredients:

AMBICURE™ XP 150 vinyl polymer 42.5%

Water 15.7%

Benzaldehyde 0.3%

SURFYNOL™ 502 nonionic surfactant (Air Products and Chemicals) 2.75%

N-methylpyrrolidone coalescing agent 4.0%

Ethylene glycol 1.25%

Dibutyl phthalate plasticizer 0.25%

NEOREZ XR 9684 polyurethane 29.2%

SURFYNOL™ DF-58 defoamer (Air Products and Chemicals) 0.05%

392N35 wax emulsion (Chemical Corp. of America) 4.0%

EXAMPLE 2

Comparison of Storage Stability

The storage stability of the preferred composition of this invention (shown in Example 1) was compared to a coating composition which is outside the scope of this invention. This Control composition was prepared in a similar fashion and had the following components:

Control Composition Ingredients:

AMBICURE™ DV3872 vinyl polymer 38.45% Water 22.8%

SURFYNOL™ 502 nonionic surfactant 2.5%

N-methylpyrrolidone coalescing agent 3.0%

Ethylene glycol 1.25%

Dibutyl phthalate plasticizer 0.25%

SANCURE™ 825 polyurethane 27.75%

392N35 wax emulsion (Chemical Corp. of America) 4.0%

SANCURE™ 825 was a triethylamine neutralized polyurethane obtained from Sanncor Corporation.

The Control composition was compared to the composition of this invention in the following manner. A sample (15 g) of each composition was added to individual vials, which were then closed to prevent leakage, heated to about 55° C. and incubated for several days. Upon inspection of the vials on a daily basis, it was found that the Control composition had gelled in 5 days, whereas the composition of this invention was stable for 9 days.

The invention has been described in detail with particular reference to preferred embodiments thereof, but it will be understood that variations and modifications can be effected within the spirit and scope of the invention.

We claim:

1. A water-based, self-curing storage-stable coating composition comprising:
   (1) an aqueous dispersion of a self-curing vinyl polymer prepared by addition polymerization;
   (2) a polyurethane dispersion prepared by chain extension of a prepolymer reaction product of a diisocyanate and one or more polyols, at least one polyol being a carboxy-substituted polyol, the polyurethane dispersion being neutralized with ammonia or ammonium hydroxide; and
   (3) a water-soluble catalyst for initiating cross-linking of said vinyl polymer aqueous dispersion;
   wherein the aqueous dispersion of a self-curing vinyl polymer has been polymerized before being mixed with the neutralized polyurethane dispersion.

2. The composition of claim 1 wherein the aqueous dispersion has a pH of from about 7.5 to about 10, and comprises a self-curing vinyl polymer prepared by addition polymerization of:
   (i) an ethylenically unsaturated polymerizable monomer having an active methylene group,
   (ii) an ethylenically unsaturated polymerizable monomer having an epoxy group,
   (iii) an ethylenically unsaturated polymerizable carboxylic acid monomer, and
   (iv) one or more additional ethylenically unsaturated polymerizable monomers other than those in groups (i), (ii) and (iii).

3. The composition of claim 2 wherein: the weight ratio of monomer (i) to monomer (ii) is less than or equal to about 1:2 or greater than or equal to about 3:2 based on the total weight of monomers (i) and (ii),
   the weight ratio of monomer (ii) to monomer (iii) is greater than or equal to about 3:2 based on the total weight of monomers (ii) and (iii),
   the total amount of monomers (i), (ii) and (iii) incorporated into said vinyl polymer is from about 8 to about 60 weight percent of the total weight of said vinyl polymer, and
   monomer (iv) is present in an amount of from about 40 to about 92 weight percent of the total weight of said vinyl polymer.

4. The composition of claim 2 wherein the pH of said aqueous dispersion is from about 8 to about 9,
   said monomer (i) is either acetoacetoxyethyl acrylate or acetoacetoxyethyl methacrylate, said monomer (ii) is either glycidyl acrylate or glycidyl methacrylate, said monomer (iii) is either acrylic acid or methacrylic acid, and said monomer (iv) is either methyl methacrylate or butyl acrylate.

5. The composition of claim 1 wherein the weight percent solids of said aqueous vinyl polymer dispersion is from about 20% to about 70%.

6. The composition of claim 1 wherein said water-soluble catalyst is tetramethylammonium hydroxide.

7. The composition of claim 1 wherein said polyurethane is prepared by hydrazine chain extension of a prepolymer reaction product of a 4,4'-dicyclohexylmethylene diisocyanate, poly (1,6-hexanediol/neopentyl glycol adipate) and 2,2-dimethylol propionic acid.

8. The composition of claim 1 wherein the weight ratio of said self-curing vinyl polymer to said polyurethane is from about 1:4 to about 4:1.

9. The composition of claim 1 wherein the weight ratio of said self-curing vinyl polymer to said polyurethane is from about 1:1 to about 3:1.

10. The composition of claim 1 further comprising a coalescing agent, defoamer, mar-resistance additive, surfactant or plasticizer.

11. The composition of claim 1 further comprising a pigment.

12. The composition of claim 1 wherein said polyurethane is neutralized with ammonium hydroxide.

13. The composition of claim 1 wherein said polyurethane is prepared using aliphatic or alicyclic diisocyanates and non-aromatic chain extenders.

14. A method for improving the long-term storage stability of a water-based coating composition which is self-curing at room temperature, said coating composition comprising a mixture of:

(1) an aqueous dispersion of a self-curing vinyl polymer prepared by addition polymerization;

(2) a polyurethane dispersion prepared by chain extension of a prepolymer reaction product of a diisocyanate and one or more polyols, at least one polyol being a carboxy-substituted polyol; and (3) a water-soluble catalyst for initiating cross-linking of said vinyl polymer aqueous dispersion, comprising the step of neutralizing said polyurethane dispersion with ammonia or ammonium hydroxide.

15. The method of claim 14 wherein the aqueous dispersion has a pH of from about 7.5 to about 10, and comprises a self-curing vinyl polymer prepared by addition polymerization of:

(i) an ethylenically unsaturated polymerizable monomer having an active methylene group, (ii) an ethylenically unsaturated polymerizable monomer having an epoxy group, (iii) an ethylenically unsaturated polymerizable carboxylic acid monomer, and (iv) one or more additional ethylenically unsaturated polymerizable monomers other than those in groups (i), (ii) and (iii).

16. The method of claim 15 wherein:

the weight ratio of monomer (i) to monomer (ii) is less than or equal to about 1:2 or greater than or equal to about 3:2 based on the total weight of monomers (i) and (ii), the weight ratio of monomer (ii) to monomer (iii) is greater than or equal to about 3:2 based on the total weight of monomers (ii) and (iii), the total amount of monomers (i), (ii) and (iii) incorporated into said vinyl polymer is from about 8 to about 60 weight percent of the total weight of said vinyl polymer, and monomer (iv) is present in an amount of from about 40 to about 92 weight percent of the total weight of said vinyl polymer.

17. The method of claim 16 wherein:

said monomer (i) is either acetoacetoxyethyl acrylate or acetoacetoxyethyl methacrylate, said monomer (ii) is either glycidyl acrylate or glycidyl methacrylate, said monomer (iii) is acrylic acid or methacrylic acid, and said monomer (iv) is methyl methacrylate or butyl acrylate.

18. The method of claim 14 wherein the weight percent solids of said vinyl polymer dispersion is from about 20 percent to about 70 percent.

19. The method of claim 14 wherein said water-soluble catalyst is tetramethylammonium hydroxide.

20. The method of claim 14 wherein said polyurethane is prepared by hydrazine chain extension of a prepolymer reaction product of a 4,4'-dicyclohexylmethylene diisocyanate, poly (1,6 -hexanediol/neopentyl glycol adipate) and 2,2-dimethylol propionic acid.

21. The method of claim 14 wherein the weight ratio of said self-curing vinyl polymer to said polyurethane is from about 1:4 to about 4:1.

22. The method of claim 21 wherein the weight ratio of said self-curing vinyl polymer to said polyurethane is about 1:1 to about 3:1.

23. The method of claim 14 wherein said coating composition further comprises a coalescing agent, defoamer, mar-resistance additive, surfactant or plasticizer.

24. The method of claim 14 wherein said coating composition further comprises a pigment.

25. The method of claim 14 wherein said polyurethane is neutralized with ammonium hydroxide.

26. The method of claim 14 wherein said polyurethane is prepared using aliphatic or alicyclic diisocyanates and non-aromatic chain extenders.

* * * * *